United States Patent Office
3,565,624
Patented Feb. 23, 1971

3,565,624
METHOD OF SUBBING POLYETHYLENE AND PRODUCT PRODUCED THEREBY
Norman D. Uffindell, London, England, assignor to Eastman Kodak Company, Rochester, N.Y., a corporation of New Jersey
No Drawing. Filed Feb. 24, 1969, Ser. No. 801,813
Claims priority, application Great Britain, Nov. 8, 1968, 53,059/68
Int. Cl. G03c 1/00, 1/84, 1/94
U.S. Cl. 96—85                18 Claims

ABSTRACT OF THE DISCLOSURE

Polyethylene surfaces are rendered hydrophilic and thereby more receptive to the adhesion of hydrophilic colloid layers by coating with a solution of a tribromomethylated derivative of quinoline and then exposing the coated surface to ultraviolet radiation to effect grafting of the quinoline derivative to the polyethylene. This method is utilized with particular advantage in the manufacture of photographic elements to provide improved adhesion of the photosensitive gelatin-silver halide emulsion layer to polyethylene or polyethylene-coated supports.

---

This invention relates in general to surface treatment of polyethylene. More specifically, this invention relates to a method of subbing polyethylene articles such as films or polyethylene coated papers to make the polyethylene surface hydrophilic, and thereby more receptive to the adhesion of hydrophilic colloid layers. In one particular aspect, the invention relates to the production of photographic elements wherein a polyethylene layer is subbed in order to improve the adhesion of a gelatin layer thereto.

It is well known that in applying hydrophilic coating compositions, such as water based inks, dyes, aqueous solutions or dispersions of gelatin, protein derivatives, cellulose derivatives, polyvinyl alcohol, etc., and the like, to polyethylene, improved bonding of the hydrophilic layer can be achieved by treating the inherently hydrophobic polyethylene surface to render it hydrophilic. Known methods for such treatment include oxidative treatments which increase the number of polar groups and points of unsaturation and subbing treatments which increase the hydrophilic nature of the surface by attaching polar molecules thereto, either by physical adsorption or by chemical bonding. Among the subbing compositions utilized in the latter type of treatment are those composed of polymers, or monomers which are capable of undergoing additional polymerization, the molecules of which contain both points of unsaturation and hydrophilic groups. In using these compositions, the coated surface is irradiated in the presence of a photosensitizer, whereby the subbing composition is chemically grafted to the surface of the polyethylene to render it hydrophilic.

In accordance with this invention, polyethylene is subbed by the application of a surface coating of a compound which contains at least one hydrophilic group and, in addition, a group which is capable of forming free radicals upon irradiation, followed by exposure of the coated surface to sufficient radiation to effect grafting of such compound to the polyethylene. By virtue of the free radical forming group the grafting is accomplished without any need for utilizing a photosensitizer, as has been required in the prior art, while the presence of the hydrophilic groups renders the treated polyethylene surface hydrophilic and thereby receptive to the adhesion of hydrophilic colloid layers.

More specifically, the method of this invention comprises the steps of coating the surface of polyethylene with a solution of a tribromomethylated derivative of quinoline and then exposing the coated surface to ultraviolet radiation to effect grafting of the quinoline derivative to the polyethylene. The solution utilized is a highly dilute solution of the quinoline derivative in an organic solvent which is capable of wetting the polyethylene surface and the irradiation with ultraviolet light is carried out either before or after drying of the coating. After treatment, the polyethylene surface is hydrophilic in character and hydrophilic colloid layers, for example, photographic emulsion layers, exhibit excellent adhesion thereto, even during subsequent wet processing treatments.

The method of this invention is not limited with respect to the nature of the polyethylene used and is applicable, for example, to low, medium and high density polyethylenes. Moreover, a wide variety of articles which include a polyethylene surface are advantageously subjected to the treatment described herein. For example, the article may be a polyethylene film or a laminate of polyethylene bonded to a polymeric substrate, for example, a laminate of polyethylene and a polyester such as polyethylene terephthalate. Of particular importance are the polyethylene coated papers which are widely used in the photographic industry as the support for manufacture of photographic elements.

The tribromomethylated quinoline derivatives of utility for the purposes of this invention are compounds represented by the following structural formulae:

(I)
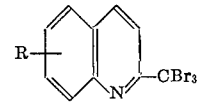

(II)
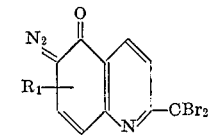

(III)
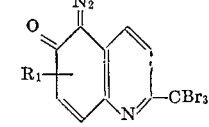

(IV)
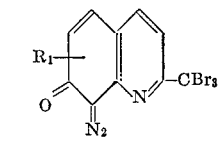

and (V)
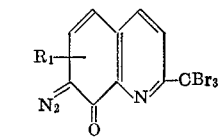

In the above structural formulae, each R is, independently, a halogen atom; a lower acylamido group, i.e., an acylamido group wherein the acyl radical contains up to four carbon atoms such as acetamido, propionamido or butyramido; or a diazoniumfluoborate radical; and $R_1$ is a hydrogen atom, a lower alkyl group, i.e., an alkyl group of up to 4 carbon atoms such as methyl, ethyl, propyl or butyl, or a group as designated by the symbol R, i.e., each $R_1$ is, independently, a hydrogen atom, a halogen atom; a lower acylamido group; a diazoniumfluoborate radical; or a lower alkyl group.

Illustrative examples of the aforesaid compounds include the following:

6-acetamide-2-tribromomethylquinoline,
6-propionamido-2-tribromomethylquinoline,
6-butyramido-2-tribromomethylquinoline,
6-acetamido-5-bromo-2-tribromomethylquinoline,
6-acetamido-5-chloro-2-tribromomethylquinoline,
5-acetamido-6,8-dibromo-2-tribromomethylquinoline,
5-methyl-6-acetamido-2-tribromomethylquinoline,
5-butyl-6-acetamido-2-tribromomethylquinoline,
5-bromo-6-diazoniumfluoborate-2-tribromomethylquinoline,
5-chloro-6-diazoniumfluoborate-2-tribromomethylquinoline,
5,6-dihydro-6-diazo-2-tribromomethylquinoline-5-one,
5,6-dihydro-6-diazo-8-methyl-2-tribromomethylquinoline-5-one,
8-bromo-5-diazo-5,6-dihydro-2-tribromomethylquinoline-6-one,
8-methyl-5-diazo-5,6-dihydro-2-tribromomethylquinoline-6-one,
5-bromo-8-diazo-7,8-dihydro-2-tribromomethylquinoline-7-one,
5-methyl-8-diazo-7,8-dihydro-2-tribromomethylquinoline-7-one,
5-bromo-7-diazo-7,8-dihydro-2-tribromomethylquinoline-8-one,
5-methyl-7-diazo-7,8-dihydro-2-tribromomethylquinoline-8-one, and the like.

The tribromomethylated quinoline derivatives described hereinabove can be prepared using known quinoline or quinaldine compounds as starting materials. Detailed descriptions of the preparation of 6-acetamido-5-bromo-2-tribromomethylquinoline, of 5,6-dihydro-6-diazo-2-tribromomethylquinoline-5-one, and of 5,6-dihydro-6-diazo-8-methyl-2-tribromomethylquinoline-5-one are included with the working examples hereinafter provided and the other related compounds which are utilized in accordance with this invention can be prepared by analogous methods, as would be apparent to one of ordinary skill in the art.

In carrying out the subbing of polyethylene pursuant to the method of this invention, the quinoline derivative is dissolved in a suitable solvent to form a solution which is coated on the polyethylene surface. The solvent used must be capable of wetting the polyethylene, or must contain additives which enable it to do so, and must be capable of dissolving the quinoline derivative yet not react with it. It is also preferred that the solvent not absorb the ultraviolet radiation but, since the subbing composition is applied as a very thin layer, this is not an essential requirement. Numerous solvents possessing the required characteristics are readily available. Examples of suitable solvents are alkanols, such as ethanol, propanol, butanol, and the like; hydrocarbons such as hexane, heptane, cyclohexane, and the like; ketones such as methyl ethyl ketone, diethyl ketone, cyclohexanone, and the like; and chlorinated hydrocarbons such as methylene chloride, ethylene chloride, dichloroethylene, chlorobenzene, and the like. The solution of the quinoline derivative in the solvent should be highly dilute, the lower limit of concentration which will provide a useful improvement in adhesion depending to some extent on the particular quinoline derivative employed and on the extent of irradiation, and the upper limit being determined by the solubility of the quinoline derivative in the solvent employed and the transparency of the resulting solution to ultraviolet radiation. Good results are ordinarily obtained with solutions containing about 0.0005 to about 1 percent by weight of the quinoline derivative. Preferred amounts are from about 0.001 to about 0.5 percent by weight.

The subbing composition can be applied to the polyethylene in any suitable manner known to the coating art, for example, by dipping, hopper coating, doctor blade coating, and the like. The coating thickness, i.e., the wet thickness of the layer of subbing solution applied to the polyethylene, is typically from about 0.1 to about 10 mils, but coatings of lesser or greater thickness can also be employed, if desired.

The irradiation of the coated polyethylene surface to effect grafting of the quinoline derivative to the polyethylene is effected by exposing the coated surface to ultraviolet radiation. Such exposure may be carried out while the coating is still wet or after it has been dried. The ultraviolet light utilized can have a wavelength in the range from about 2000 to about 3500 A. A suitable source of the ultraviolet radiation is a low pressure mercury vapor lamp. The total dosage of ultraviolet radiation required is dependent upon the particular quinoline derivative used and its concentration in the solvent and upon the transparency of the solvent. Generally speaking, the greater the dosage the greater the degree to which grafting of the quinoline derivative to the polyethylene takes place. Moreover, it is ordinarily desirable to utilize a relatively longer exposure time, with a given light source, where the concentration of quinoline derivative in the solvent is low. Good results are ordinarily obtained where the total dosage is in the range from about 300 to about 4000 watt seconds per square foot of polyethylene surface treated.

While applicant does not intend to be bound by any theoretical explanation of the manner in which his invention functions, it is believed that the ultraviolet radiation forms free radicals on the polyethylene surface by breaking open double bonds present in the polyethylene and also forms free radicals from the tribromomethyl group and, as a consequence, grafting of the quinoline derivative to the polyethylene occurs. The heterocyclic nitrogen atom in the ring is thought to have an activating effect on the tribromomethyl group alpha thereto which promotes such free radical formation. The presence of a hydrophilic group on the molecule, or a potential hydrophilic group which is converted by the ultraviolet radiation into a hydrophilic group, results in the introduction of hydrophilic groups onto the surface of the polyethylene, whereby this surface is rendered hydrophilic and hence receptive to the adhesion of hydrophilic colloid layers.

In one embodiment of the present invention, a polyethylene layer is subbed in the manner hereinbefore described and thereafter a photosensitive gelatin-silver halide emulsion layer is applied over the subbing layer, in accordance with conventional practice in the photographic art, to produce a photographic element. In the manufacture of such elements, polyethylene coated paper is particularly useful as the substrate. As a result of the subbing treatment, the adhesion of the emulsion layer is greatly improved and the resulting photographic element can be subjected to severe processing treatments, as for example on a drum processing machine, without detachment of the emulsion layer from the substrate.

In the practice of this invention, it is preferred to coat the subbed polyethylene surface with a dilute aqueous solution of a hydrophilic colloid before applying the final coating of hydrophilic colloid, as this results in improved adhesion. For example, in preparing a photographic element by this preferred procedure, polyethylene coated paper is first coated with a solution of the quinoline derivative and subjected to irradiation and then a dilute aqueous solution of gelatin, i.e., a solution containing about 0.01% to about 2.5% by weight of gelatin, is applied. The resulting surface exhibits a very low receding contact angle with water. Subsequently, the photosensitive gelatin-silver halide emulsion layer is applied and excellent adhesion of this layer to the substrate is achieved.

Illustrative preparations of the tribromomethylated quinoline derivatives utilized in the practice of this invention are as follows:

PREPARATION OF 6-ACETAMIDO-5-BROMO-2-TRIBROMOMETHYLQUINOLINE

A mixture of 21.0 grams of 6-acetamidoquinaldine and 90 grams of anhydrous sodium acetate in 210 milliliters of glacial acetic acid is heated to 70° C. and a solution of 67.2 grams of bromine in 90 milliliters of glacial acetic acid is added over 30 minutes with stirring. The temperature is then raised to 92° C. and heating is continued for an additional 90 minutes, whereupon the reaction mixture is cooled to room temperature and allowed to stand overnight. After filtering off the crystalline solid, washing with acetic acid and then with water, and recrystallizing from glacial acetic acid, there is obtained 45.0 grams of pure 6-acetamido-5-bromo-2-tribromomethylquinoline having a melting point of 194–195° C.

PREPARATION OF 5,6-DIHYDRO-6-DIAZO-2-TRIBROMOMETHYLQUINOLINE-5-ONE

To 9 milliliters of 98% concentrated sulfuric acid there is added with stirring at room temperature 3 grams of 6-acetamido-5-bromo - 2 - tribromomethylquinoline. The resulting clear solution is heated on a steam bath for 10 minutes and then cooled to 15° C. whereupon 0.41 gram of solid sodium nitrate is gradually added and stirring continued for 30 minutes. The reaction mixture is then poured into 50 grams of ice and allowed to stand at 0° C. for 30 minutes and the pale yellow solid which forms is recovered by filtering, washed with ice cold 25% sulfuric acid and immediately dissolved, while still damp, in 100 milliliters of 50% aqueous alcohol at room temperature. Addition of 10 milliliters of aqueous saturated sodium acetate results in immediate formation of a precipitate and after stirring the mixture for 30 minutes at room temperature there is obtained 2.0 grams of product, which, after crystallization from alcohol, is identified as pure 5,6-dihydro-6-diazo-2-tribromomethylquinoline-5-one.

PREPARATION OF 5,6 - DIHYDRO - 6 - DIAZO - 8-METHYL - 2 - TRIBROMOMETHYLQUINOLINE-5-ONE

To 43.2 grams of 2,8-dimethyl-6-nitroquinoline there is added 270 grams of stannous chloride dihydrate in concentrated hydrochloric acid, whereby the 2,8-dimethyl-6-nitro-quinoline is reduced to the 6-amino derivative with a yield of 34 grams of product which, upon recrystallizing from methanol, is identified as pure 6-amino-2,8-dimethylquinoline having a melting point of 163–165° C. Treatment of 29 grams of the 6-amino-2,8-dimethylquinoline with 170 milliliters of acetic anhydride yields 36 grams of 6-acetamido-2,8-dimethylquinoline which, after recrystallization from methanol, has a melting point of 198–200° C. A portion of the 6-acetamido-2,8-dimethylquinoline weighing 11.3 grams is then subjected to the same reaction sequence as is described hereinabove with reference to preparation of 6-acetamido-5-bromo-2-tribromomethylquinoline and the result is formation of 19.39 grams of pure 6-acetamido-5-bromo-8-methyl-2-tribromomethylquinoline having a melting point of 172–173° C. A portion of the 6-acetamido-5-bromo-8-methyl-2-tribromomethylquinoline weighing 5.3 grams is then subjected to the same reaction sequence as is described hereinabove with reference to preparation of 5,6-dihydro-6-diazo-2-tribromomethylquinoline-5-one and the result is formation of 2.45 grams of pure 5,6-dihydro-6-diazo-8-methyl-2-tribromomethylquinoline-5-one having a melting point of 120–121° C.

The invention is further illustrated by the following examples of its practice.

EXAMPLE 1

A solution consisting of 0.016 percent by weight of 5,6 - dihydro-6-diazo-2-tribromomethylquinoline-5-one in chlorobenzene was prepared and polyethylene coated paper was passed through the solution and dried. The coated polyethylene surface was then irradiated for one minute with ultraviolet light (2537 A.) to effect grafting of the 5,6-dihydro-6-diazo-2-tribromomethylquinoline-5-one to the polyethylene. After grafting, the coated paper was passed through a 0.3 percent by weight aqueous gelatin solution and then coated with a 10 percent by weight aqueous gelatin solution containing 0.8 percent by weight chrome alum as hardening agent. The gelatin layer adhered strongly to the polyethylene coated paper as evidenced by the fact that the product withstood processing in a color developer solution at 20° C. on a drum processing machine with no reticulation of the gelatin layer occurring within five minutes. The coating similarily withstood processing in a 2 percent by weight aqueous acetic acid solution.

Similar results are obtained by substituting other quinoline derivatives, such as 5,6-dihydro-6-diazo-8-methyl-2-tribromomethylquinoline-5-one, and the like, for the 5,6-dihydro-6-diazo-2-tribromomethylquinoline-5-one. On the other hand, very poor adhesion of the gelatin layer occurred when attempts were made to replace the 5,6-dihydro - 6 - diazo - 2 - tribromomethylquinoline - 5 - one with 5,6-dihydro-6-diazo-2-methylquinoline-5-one or with tribromoacetic acid or with β-tribromopropionic acid.

EXAMPLE 2

In a similar manner to Example 1, polyethylene coated paper was subbed using a 0.032 percent by weight solution of 5,6-dihydro-6-diazo-2-tribromomethylquinoline-5-one in ethanol and irradiating with ultraviolet radiation for 5 seconds and similar good adhesion of a gelatin layer was obtained.

EXAMPLE 3

In a similar manner to Example 1, polyethylene coated paper was subbed with solutions of 6-acetamido-2-tribromomethylquinoline in chlorobenzene with concentrations ranging from 0.001 to 0.5 percent by weight and good adhesion of gelatin coating compositions was obtained.

EXAMPLE 4

In a similar manner to Example 1, polyethylene coated paper was subbed by coating with a 0.032 percent by weight solution of 5-bromo-6-diazoniumfluoborate-2-tribromomethylquinoline in ethanol and irradiating for one minute with ultraviolet light. Good adhesion of gelatin layers to the subbed polyethylene surface was again obtained.

The invention has been described in detail with particular reference to preferred embodiments thereof, but it will be understood that variations and modifications can be effected within the spirit and scope of the invention.

I claim:
1. A method of subbing polyethylene to render it more receptive to the adhesion of hydrophilic colloid layers, comprising (1) coating the surface of said polyethylene with a solution of a quinoline derivative selected from the group consisting of compounds of the formulae:

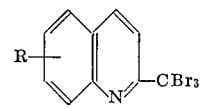

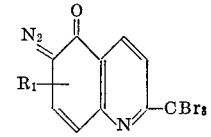

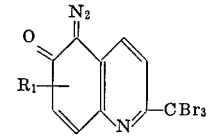

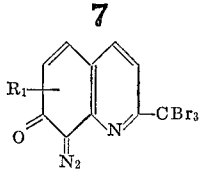

and

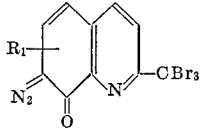

wherein each R is independently selected from the group consisting of a halogen atom, a lower acylamido group and a diazoniumfluoborate radical and each $R_1$ is independently selected from the group consisting of a hydrogen atom, a halogen atom, a lower acylamido group, a diazoniumfluoborate radical and a lower alkyl group, and (2) exposing said coated surface to ultraviolet radiation to effect grafting of said quinoline derivative to said polyethylene.

2. The method as described in claim 1 wherein said exposure to ultraviolet radiation is carried out prior to drying of said coating.

3. The method as described in claim 1 wherein said exposure to ultraviolet radiation is carried out subsequent to drying of said coating.

4. The method as described in claim 1 wherein the concentration of said quinoline derivative in said solution is from about 0.0005 to about 1 percent by weight.

5. The method as described in claim 1 wherein the concentration of said quinoline derivative in said solution is from about 0.001 to about 0.5 percent by weight.

6. The method as described in claim 1 wherein said quinoline derivative is 5,6-dihydro-6-diazo - 2-tribromomethylquinoline-5-one.

7. The method as described in claim 1 wherein said quinoline derivative is 6-acetamido - 2-tribromomethylquinoline.

8. The method as described in claim 1 wherein said quinoline derivative is 5-bromo - 6-diazoniumfluoborate 2-tribromomethylquinoline.

9. An article comprising a polyethylene layer and a subbing layer bonded thereto which serves to render said polyethylene more receptive to the adhesion of hydrophilic colloid layers, said subbing layer comprising a quinoline derivative which is grafted to said polyethylene, said quinoline derivative being selected from the group consisting of compounds of the formulae:

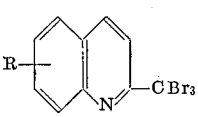

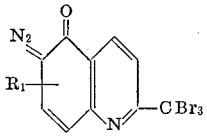

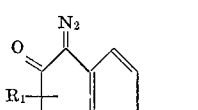

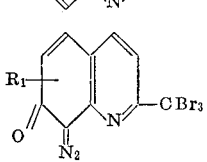

wherein each R is independently selected from the group consisting of a halogen atom, a lower acylamido group, and a diazoniumfluoborate radical and each $R_1$ is independently selected from the group consisting of a hydrogen atom, a halogen atom, a lower acylamido group. a diazoniumfluoborate radical and a lower alkyl group.

10. The article as described in claim 9 wherein said polyethylene layer is a polyethylene coating carried by a paper substrate.

11. The article as described in claim 9 wherein said quinoline derivative is 5,6-dihydro-6-diazo - 2-tribromomethylquinoline-5-one.

12. A photographic element comprising (1) a support having a surface of polyethylene, (2) a subbing layer comprising a quinoline derivative which is grafted to said polyethylene surface, said quinoline derivative being selected from the group consisting of compounds of the formulae:

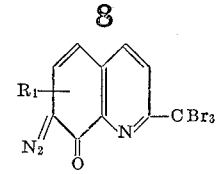

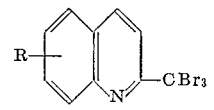

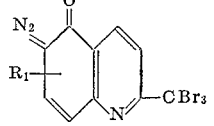

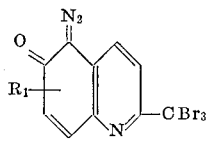

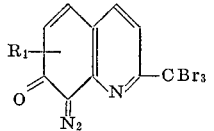

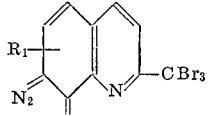

wherein each R is independently selected from the group consisting of a halogen atom, a lower acylamido group, and a diazoniumfluoborate radical and each $R_1$ is independently selected from th group consisting of a hydrogen atom, a halogen atom, a lower acylamido group, a diazoniumfluoborate radical and a lower alkyl group, and (3) a photosensitive gelatin-silver halide emulsion layer in contact with said subbing layer.

13. A photographic element as described in claim 12 wherein said support is polyethylene coated paper.

14. A photographic element as described in claim 12 wherein said quinoline derivative is 5,6-dihydro-6-diazo-2-tribromomethylquinoline-5-one.

15. A method of making a photographic element, comprising (1) providing a support having a surface of polyethylene, (2) coating said polyethylene surface with a solution of a quinoline derivative selected from the group consisting of compounds of the formulae:

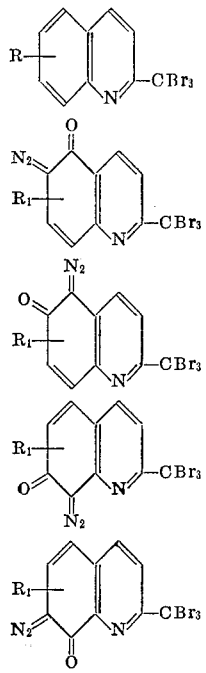

wherein each R is independently selected from the group consisting of a halogen atom, a lower acylamido group, and a diazoniumfluoborate radical and each $R_1$ is independently selected from the group consisting of a hydrogen atom, a halogen atom, a lower acylamido group, a diazoniumfluoborate radical and a lower alkyl group, (3) exposing said coated surface to ultraviolet radiation to effect grafting of said quinoline derivative to said polyethylene, and (4) applying to said coated surface a photosensitive gelatin-silver halide emulsion.

16. The method as described in claim 15 wherein said support is polyethylene coated paper.

17. The method as described in claim 15 wherein said quinoline derivative is 5,6-dihydro-6-diazo-2-tribromomethylquinoline-5-one.

18. The method as described in claim 15 additionally comprising the step of applying to the coated surface prior to application of the photosensitive gelatin-silver halide emulsion a layer of an aqueous solution containing about 0.01 to about 2.5 percent by weight of gelatin.

References Cited
UNITED STATES PATENTS

| | | | |
|---|---|---|---|
| 3,309,221 | 3/1967 | Smith | 117—47A |
| 3,134,684 | 5/1964 | Northrop et al. | 117—15 |
| 3,269,955 | 8/1966 | Rodgers et al. | 117—33.5 |
| 3,386,935 | 6/1968 | Jackson et al. | 96—87 |

NORMAN G. TORCHIN, Primary Examiner

E. C. KIMLIN, Assistant Examiner

U.S. Cl. X.R.

117—34, 47